No. 677,703. Patented July 2, 1901.
E. SCHLIEMANN.
PROCESS OF PRODUCING WAX LIKE BODIES BY THE ACTION OF OXIDIZING AGENTS.
(Application filed Sept. 3, 1898.)
(No Model.)

UNITED STATES PATENT OFFICE.

ERNST SCHLIEMANN, OF HAMBURG, GERMANY.

PROCESS OF PRODUCING WAX-LIKE BODIES BY THE ACTION OF OXIDIZING AGENTS.

SPECIFICATION forming part of Letters Patent No. 677,703, dated July 2, 1901.

Application filed September 3, 1898. Serial No. 690,221. (No specimens.)

*To all whom it may concern:*

Be it known that I, ERNST SCHLIEMANN, merchant, of 36 Katharineenstrasse, Hamburg, in the German Empire, have invented a Process of Producing a Wax-Like Body by the Action of Oxidizing Agents upon a Mixture of Rosin and Paraffin; and I do hereby declare that the following is a full, clear, and exact description of the same.

The wax surrogates hitherto sold on the market were either obtained by mechanically mixing paraffin and rosin without special chemical treatment or the paraffin and the rosin before being mixed were subjected to a peculiar treatment—as, for example, the introduction of air into the warmed raw materials. The products so obtained were all possessed of certain disadvantages which are removed by the present novel process, which is based upon the fact that rosin and paraffin are first mixed and melted, after which air is admitted in a finely-divided state, or the melted mixture may be oxidized in any other suitable manner.

Figure 1:
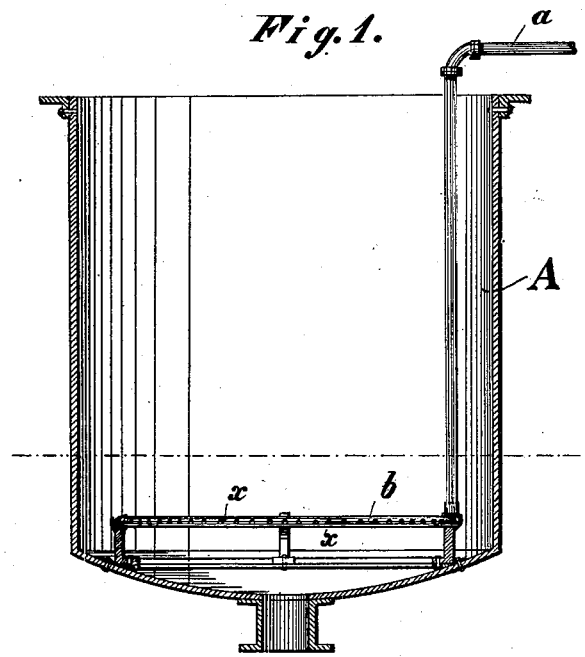
Figure 2:
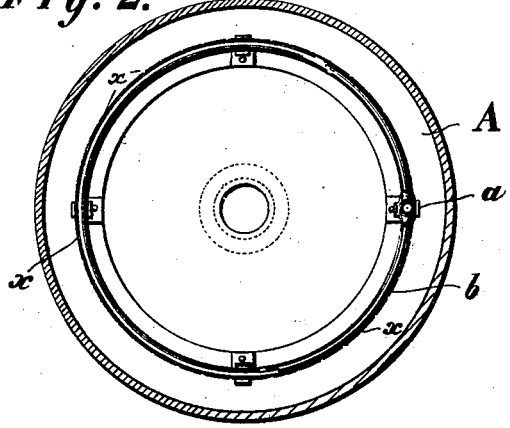

An apparatus suitable for carrying out this invention is represented in the accompanying drawings, Figure 1 being a vertical section, and Fig. 2 a horizontal section, thereof.

A mixture of paraffin and rosin, the relative proportions of which may vary between the limits of ten to fifty per cent. rosin and ninety to fifty per cent. paraffin, is heated to 90° centigrade and finely-divided atmospheric air or oxygen is injected. By this means insoluble rosin is precipitated from the melted mass. This treatment of the mass is continued until further rosin is not separated and the mass assumes a peculiar sweet smell. When no more rosin is precipitated or rises to the surface, the process is complete. From one-half cubic meter to two cubic meters of air per minute for eight to twelve hours is necessary for the treatment of a mass of one thousand kilograms of the mixture. The treatment of the melted mass with the air is continued for eight to twenty-four hours or longer if found necessary by the condition of the mass. The insoluble rosin is removed by subsidence. Any scum disappears as soon as the injection of air is stopped. The product of this reaction is then boiled by steam for about one hour in order to separate the remainder of the insoluble rosin. After this small quantities of solid hydrocarbons, such as ceresin, are added and the product is sold in its natural color or can be colored as desired by adding suitable materials.

The quantity of ceresin may vary considerably. The object of the same is to render the wax-like body harder. In practice I produce some goods containing five per cent. ceresin to ninety-five per cent. of the ceresin (mixture) and others containing fifty per cent. of ceresin to fifty per cent. of ceresin. The rosin serving for this purpose is American or French rosin obtained by the distilling of turpentine. The paraffin can be of different constitution. For example, thirty-five per cent. yellow American paraffin scalings may be mixed with thirty-five per cent. American refined paraffin and thirty per cent. American rosin.

A is the vat in which the rosin and paraffin are melted together. Air is conducted into the coil $b$ through the tube $a$, which communicates with an air-compressor. The tube $b$ is provided with fine perforations $x$, through which the air issues into the mixture. Steam can also be led into the mixture by the same or a similar device. For this purpose a pipe $e$ may be provided, leading from tube $b$ to any suitable source of steam. The steam should have a temperature of 100° to 150° centigrade. By blowing air into the mixture of rosin and paraffin in the molten condition a peculiar action takes place therein which gives to the final product new characteristic properties as distinguished from the raw products. It, moreover, differs very essentially from the products already known in which the rosin and paraffin are treated with air or other agent before being mixed. The action of the air is as follows: Whereas upon injecting air into molten rosin a part of the same becomes oxidized and volatilizes, an excessive oxidation is prevented by the presence of paraffin in consequence of the fact that the paraffin surrounds the molten particles of rosin and protects them from a too violent action. That part of the rosin which melts at a lower temperature and remains dissolved in the mixture loses its sticky property or quality, whereas the other parts, which melt at a higher temperature, are disassociated, being insoluble.

The same effect is obtained when the mixture of rosin and paraffin warmed to 90° centigrade is treated with an oxidizing agent other than atmospheric air—as, for example, with eight to ten per cent. of concentrated nitric acid.

When nitric acid is used for the oxidation, the rosin and paraffin are melted together at a temperature of about 80° centigrade, as above described; but in place of blowing in air about eight to ten per cent. of concentrated nitric acid is added, and the heat is continued until separation of insoluble substances from the liquid, either by precipitation or rising to the surface, no longer takes place. The result of the process so carried out is a wax-like material similar to that produced by the action of air.

The finished product is a mass very similar to wax, many of its properties being almost the same as those of wax. It can therefore be used as a substitute for wax or ceresin, all the more because it is possessed of properties very different from known wax surrogates.

The products hitherto produced for this purpose have an indefinite unpleasant color and become soft and sticky when kneaded in the warm hand and hard and brittle when exposed for any length of time to the air, whereas the product produced according to this process possesses a brilliant wax-like color and is an unchanging elastic mass which does not become sticky when kneaded in the hand. It can, further, after being melted, during the process of cooling, be stirred to form an opaque mass in the same manner as with ceresin and beeswax, which is not possible with the products produced according to other methods.

What I claim as my invention, and desire to secure by Letters Patent, is—

1. A process for the production of a wax-like product consisting in injecting air into a molten mixture of rosin and paraffin, substantially as described.

2. A process for the production of a wax-like product consisting in exposing a melted mixture of rosin and paraffin to the action of an oxidizing agent.

In testimony whereof I have hereunto set my hand in the presence of two witnesses.

ERNST SCHLIEMANN.

Witnesses:
  GUSTAV WEBER,
  E. H. L. MUMMENHOFF.